(12) United States Patent
Namuduri et al.

(10) Patent No.: US 12,479,330 B2
(45) Date of Patent: Nov. 25, 2025

(54) FLEXIBLE VEHICLE CHARGING

(71) Applicant: GM Global Technology Operations LLC, Detroit, MI (US)

(72) Inventors: Chandra S. Namuduri, Troy, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 522 days.

(21) Appl. No.: 18/072,911

(22) Filed: Dec. 1, 2022

(65) Prior Publication Data

US 2024/0181928 A1 Jun. 6, 2024

(51) Int. Cl.
*B60L 58/20* (2019.01)
*B60L 53/16* (2019.01)
*B60L 53/62* (2019.01)
*H02J 7/00* (2006.01)

(52) U.S. Cl.
CPC ............... *B60L 58/20* (2019.02); *B60L 53/16* (2019.02); *B60L 53/62* (2019.02); *H02J 7/0024* (2013.01)

(58) Field of Classification Search
CPC .......... B60L 58/20; B60L 53/16; B60L 53/62; B60L 53/11; B60L 58/19; B60L 53/00; B60L 50/60; B60L 2240/54; H02J 7/0024; H02J 7/0013; H02J 7/00712; H02J 7/00714; H02J 7/007182
USPC ........................................................ 320/109
See application file for complete search history.

(56) References Cited

U.S. PATENT DOCUMENTS

| | | | | |
|---|---|---|---|---|
| 9,496,735 B2* | 11/2016 | Sarkar | ..................... | B60L 58/16 |
| 10,654,370 B2* | 5/2020 | Namuduri | ............... | B60L 50/66 |
| 10,675,991 B2* | 6/2020 | Hu | ......................... | H02J 7/0019 |
| 10,897,145 B2* | 1/2021 | De Breucker | ........ | H02J 7/0024 |
| 11,108,251 B2* | 8/2021 | Kirleis | ..................... | B60L 8/003 |
| 11,135,894 B2* | 10/2021 | Andrade Dias | ....... | H02J 7/0024 |
| 11,336,101 B2* | 5/2022 | Hao | ......................... | B60L 53/31 |
| 11,362,524 B2* | 6/2022 | Mituta | .................. | H02J 7/0014 |
| 2021/0020998 A1* | 1/2021 | Musafia | ................ | H01M 10/46 |
| 2021/0242704 A1* | 8/2021 | Lim | ........................ | B60L 53/63 |
| 2021/0286418 A1* | 9/2021 | Namuduri | ........... | H01M 50/502 |
| 2022/0314837 A1* | 10/2022 | Gupta | ..................... | B60L 58/26 |

FOREIGN PATENT DOCUMENTS

| | | | | |
|---|---|---|---|---|
| CN | 114709896 A | * | 7/2022 | ............ H02J 7/0024 |
| GB | 2592248 A | * | 8/2021 | ............ B60L 58/19 |
| WO | WO-2021071655 A1 | * | 4/2021 | ............ H02J 7/0063 |

OTHER PUBLICATIONS

Engelhardt et al., (Engelhardt), "Double-String Battery System with Reconfigurable Cell Topology Operated as a Fast Charging Station for Electric Vehicles" pp. 1-19; (Year: 2021).*

(Continued)

*Primary Examiner* — M Baye Diao
(74) *Attorney, Agent, or Firm* — CANTOR COLBURN LLP

(57) ABSTRACT

An apparatus and method for charging an electrified vehicle through a charge port selectively configures a plurality of battery packs including battery packs having a voltage N with a plurality of controllable switches into one of several charging configurations which may include presenting the charge port with voltage N, 2N or 3N.

20 Claims, 7 Drawing Sheets

(56) References Cited

OTHER PUBLICATIONS

S. Ci, N. Lin and D. Wu, "Reconfigurable Battery Techniques and Systems: A Survey," in IEEE Access, vol. 4, pp. 1175-1189, 2016. (Year: 2016).*

Shaheer M et al., (Shaheer), "Reconfigurable Battery Systems: A Survey on Hardware Architecture and Research Challenges", pp. 1-27 (Year: 2019).*

* cited by examiner

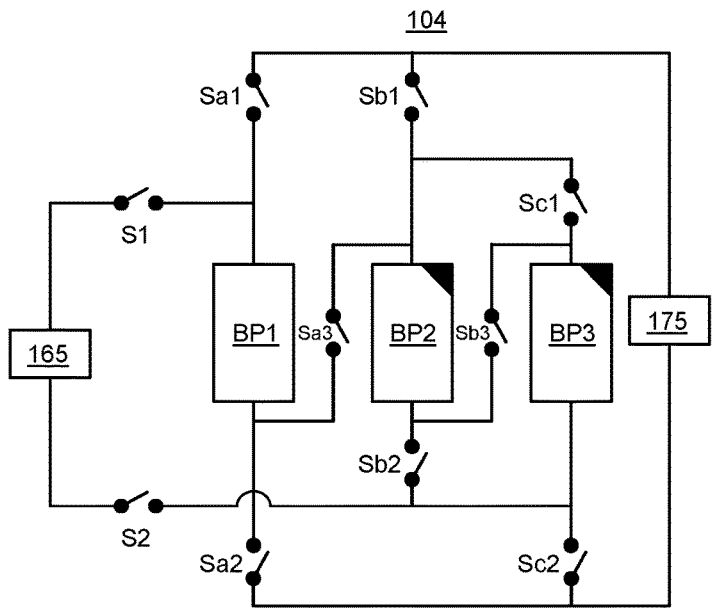
FIG. 2A
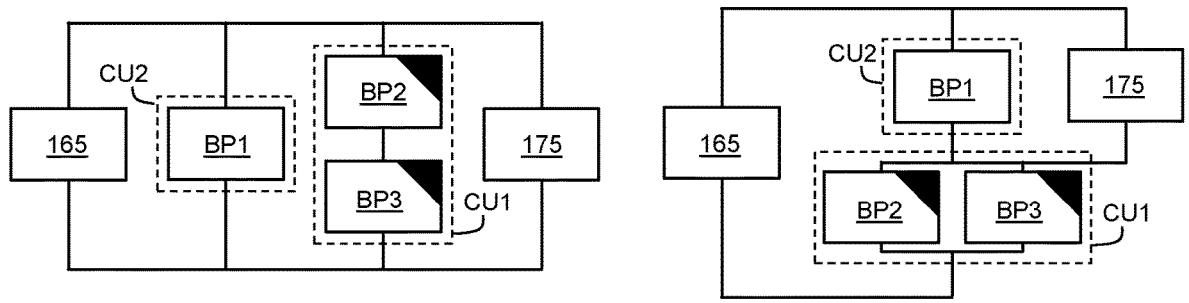
FIG. 2B
FIG. 2C

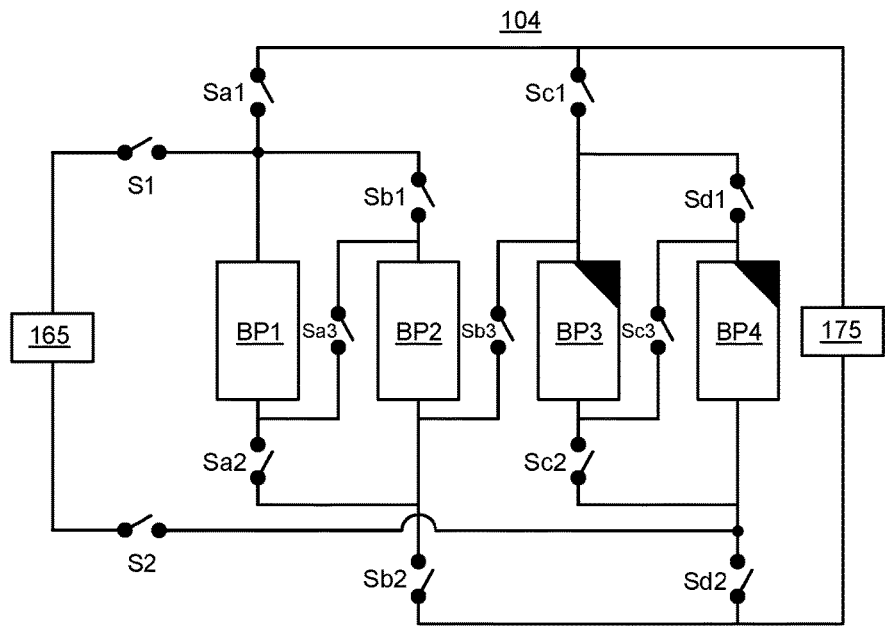
FIG. 3A
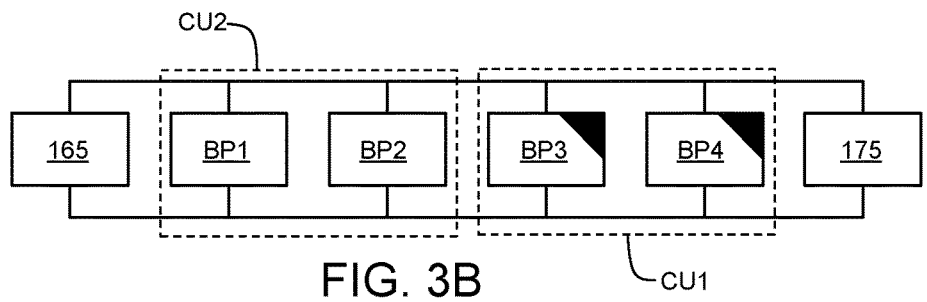
FIG. 3B
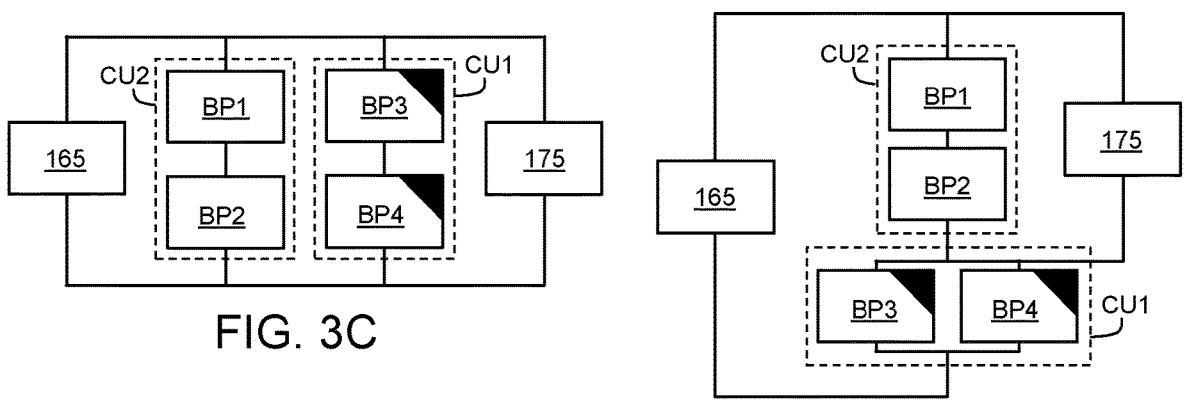
FIG. 3C
FIG. 3D

FLEXIBLE VEHICLE CHARGING

INTRODUCTION

The subject disclosure relates to electrified vehicles (EV). More particularly, the subject disclosure relates to flexible charging of an EV.

EVs vary across all weight classes from small commuter vehicles to light duty trucks and sport utility vehicles, to medium and heavy-duty vehicles such as cargo vans, service vehicles like garbage trucks, busses, tow trucks, wreckers and rotators, through various higher weight classes of over the road cargo haulers commonly referred to as big rigs. Propulsion systems vary with type of vehicle, including electrical energy storage capacity and native propulsion system voltage. Electrical storage varies from tens of kilowatt-hours in small commuter vehicles, to several hundred kilowatt-hours in medium and heavy duty vehicles, to megawatt-hours in the largest classes of vehicles. A particular propulsion system of a vehicle may not find charge compatibility outside of its own native system voltage charging stations.

SUMMARY

In one exemplary embodiment, an electrified vehicle may include a charge port, a rechargeable energy storage system including a plurality of battery packs and a plurality of switches, each battery pack having a respective battery pack voltage of N volts or 2N volts and a respective charging current capability of M amperes or 2M amperes, and a control module controlling states of the plurality of switches based on the respective battery pack voltages and the respective charging current capability to selectively establish the rechargeable energy storage system in one of a first charging configuration, a second charging configuration and a third charging configuration. The first charging configuration may include first respective states of the plurality of switches arranging the plurality of battery packs to provide a voltage of N volts at the charging port, the second charging configuration may include second respective states of the plurality of switches arranging the plurality of battery packs to provide a voltage of 2N volts at the charging port, and the third charging configuration may include third respective states of the plurality of switches arranging the plurality of battery packs to provide a voltage of 3N volts at the charging port.

In addition to one or more of the features described herein, the plurality of battery packs may include first and second battery packs having respective battery pack voltages of N volts and respective charging current capabilities of M amperes, and a third battery pack having a respective battery pack voltage of 2N volts and a respective charging current capability of 2M amperes, wherein the second charging configuration arranges the first and second battery packs in series as a series charging unit and arranges the series charging unit in parallel with the third battery pack across the charging port, and wherein the third charging configuration arranges the first and second battery packs in parallel as a parallel charging unit and arranges the parallel charging unit in series with the third battery pack across the charging port.

In addition to one or more of the features described herein, the plurality of battery packs may include first and second battery packs having respective battery pack voltages of N volts and respective charging current capabilities of M amperes, and third and fourth second battery packs having respective battery pack voltages of N volts and respective charging current capabilities of 2M amperes, wherein the first charging configuration arranges the first, second, third and fourth battery packs in parallel across the charging port, wherein the second charging configuration arranges the first and second battery packs in series as a first series charging unit, arranges the third and fourth battery packs in series as a second series charging unit, and arranges the first and second series charging units in parallel across the charging port, and wherein the third charging configuration arranges the first and second battery packs in parallel as a first parallel charging unit, arranges the third and fourth battery packs in series as a second parallel charging unit, and arranges the first and second parallel charging units in series across the charging port.

In addition to one or more of the features described herein, the plurality of battery packs may include six battery packs having respective battery pack voltages of N volts and respective charging current capabilities of M amperes, wherein the first charging configuration arranges the six battery packs in parallel across the charging port, wherein the second charging configuration arranges the six battery packs into three series strings of two battery packs, and arranges the three series strings in parallel across the charging port, and wherein the third charging configuration arranges the six battery packs into two series strings of three battery packs, the two series strings connected in parallel across the charging port.

In another exemplary embodiment, an electrified vehicle may include a charge port, a rechargeable energy storage system, a plurality of switches, a control module controlling states of the plurality of switches to selectively establish the rechargeable energy storage system in one of a plurality of charging configurations, a pair of first battery packs, each first battery pack having a first voltage and a first charging current capability, and a first charging configuration including a first charging unit including the pair of first battery packs, wherein the first battery packs in the pair of first battery packs are selectively configured in parallel, whereby the first charging unit has a respective voltage equivalent to the first voltage and a respective charging current capability two times the first charging current capability, the first charging unit selectively configured in series with a second charging unit having a respective charging current capability two times the first charging current capability.

In addition to one or more of the features described herein, the second charging unit may include a respective voltage equivalent to the first voltage.

In addition to one or more of the features described herein, the second charging unit may include a respective voltage equivalent to two times the first voltage.

In addition to one or more of the features described herein, the rechargeable energy storage system may further include a second charging configuration wherein the first charging unit is selectively configured in parallel with the second charging unit.

In addition to one or more of the features described herein, the second charging unit may include a second battery pack, the second battery pack having a respective voltage equivalent to the first voltage and a respective charging current capability two times the first charging current.

In addition to one or more of the features described herein, the second charging unit may include a pair of second battery packs, each second battery pack having a respective voltage equivalent to the first voltage and a respective charging current capability equivalent to the first charging current capability, wherein the second battery packs in the pair of second battery packs are selectively configured in parallel, whereby the second charging unit has a respective voltage equivalent to the first voltage and a respective charging current capability two times the first charging current capability.

In addition to one or more of the features described herein, the second charging unit may include a second battery pack, the second battery pack having a respective voltage equivalent to two times the first voltage and a respective charging current capability two times the first charging current.

In addition to one or more of the features described herein, the second charging unit may include a pair of second battery packs, each second battery pack having a respective voltage equivalent to the first voltage and a respective charging current capability equivalent to two times the first charging current capability, wherein the second battery packs in the pair of second battery packs are selectively configured in series, whereby the second charging unit has a respective voltage equivalent to two times the first voltage and a respective charging current capability two times the first charging current capability.

In addition to one or more of the features described herein, the second charging unit may include two pairs of second battery packs, each second battery pack having a respective voltage equivalent to the first voltage and a respective charging current capability equivalent to the first charging current capability, wherein the respective second battery packs in each pair of second battery packs are selectively configured in parallel and the pairs of second battery packs are selectively configured in series, whereby the second charging unit has a respective voltage equivalent to two times the first voltage and a respective charging current capability two times the first charging current capability.

In addition to one or more of the features described herein, the rechargeable energy storage system further comprises a second charging configuration wherein the first charging unit is selectively configured in parallel with the second charging unit and wherein the first battery packs in the pair of first battery packs are selectively configured in series, whereby the first charging unit has a respective voltage equivalent to two times the first voltage and a respective charging current capability equivalent to the first charging current capability.

In addition to one or more of the features described herein, wherein the second charging unit may include a second battery pack, the second battery pack having a respective voltage equivalent to two times the first voltage and a respective charging current capability two times the first charging current capability.

In addition to one or more of the features described herein, the second charging unit may include a pair of second battery packs, each second battery pack having a respective voltage equivalent to the first voltage and a respective charging current capability equivalent to two times the first charging current capability, wherein the second battery packs in the pair of second battery packs are selectively configured in series, whereby the second charging unit has a respective voltage equivalent to two times the first voltage and a respective charging current capability two times the first charging current capability.

In addition to one or more of the features described herein, the second charging unit may include two pairs of second battery packs, each second battery pack having a respective voltage equivalent to the first voltage and a respective charging current capability equivalent to the first charging current capability, wherein the respective second battery packs in each pair of second battery packs are selectively configured in series and the pairs of second battery packs are selectively configured in parallel, whereby the second charging unit has a respective voltage equivalent to two times the first voltage and a respective charging current capability two times the first charging current capability.

In addition to one or more of the features described herein, the rechargeable energy storage system may further include a second charging configuration wherein the first charging unit is selectively configured in parallel with the second charging unit and wherein the second charging unit comprises a pair of second battery packs, each second battery pack having a respective voltage equivalent to the first voltage and a respective charging current capability equivalent to two times the first charging current capability, wherein the second battery packs in the second charging unit are selectively configured in parallel, whereby the second charging unit has a respective voltage equivalent to the first voltage and a respective charging current capability four times the first charging current capability.

In addition to one or more of the features described herein, the rechargeable energy storage system may further include a second charging configuration wherein the first charging unit is selectively configured in parallel with the second charging unit and wherein the second charging unit comprises two pairs of second battery packs, each second battery pack having a respective voltage equivalent to the first voltage and a respective charging current capability equivalent to the first charging current capability, wherein the respective second battery packs in each pair of second battery packs are selectively configured in parallel and the pairs of second battery packs are selectively configured in parallel, whereby the second charging unit has a respective voltage equivalent to the first voltage and a respective charging current capability four times the first charging current capability.

In yet another exemplary embodiment, a method for charging an electrified vehicle through a charging port may include validating entry condition for a vehicle charge, establishing donor voltage capabilities of a charge station, establishing recipient voltage capabilities of the electrified vehicle, matching donor voltage capabilities with recipient voltage capabilities, configuring a plurality of battery packs in the electrified vehicle based upon matched donor and recipient voltage capabilities including one of a first charging configuration, a second charging configuration and a third charging configuration, wherein the first charging configuration may include first respective states of a plurality of switches arranging the plurality of battery packs to present a first recipient voltage at the charging port, wherein the second charging configuration may include second respective states of the plurality of switches arranging the plurality of battery packs to present a second recipient voltage at the charging port, the second recipient voltage being double the first recipient voltage, wherein the third charging configuration may include third respective states of the plurality of switches arranging the plurality of battery packs to present a third recipient voltage at the charging port, the third recipient voltage being triple the first recipient voltage.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 2A-2C illustrate battery packs, switches and configurations of a rechargeable energy storage system, in accordance with one or more embodiments;

FIG. 3A-3D illustrate battery packs, switches and configurations of a rechargeable energy storage system, in accordance with one or more embodiments;

DETAILED DESCRIPTION

Figure 1:
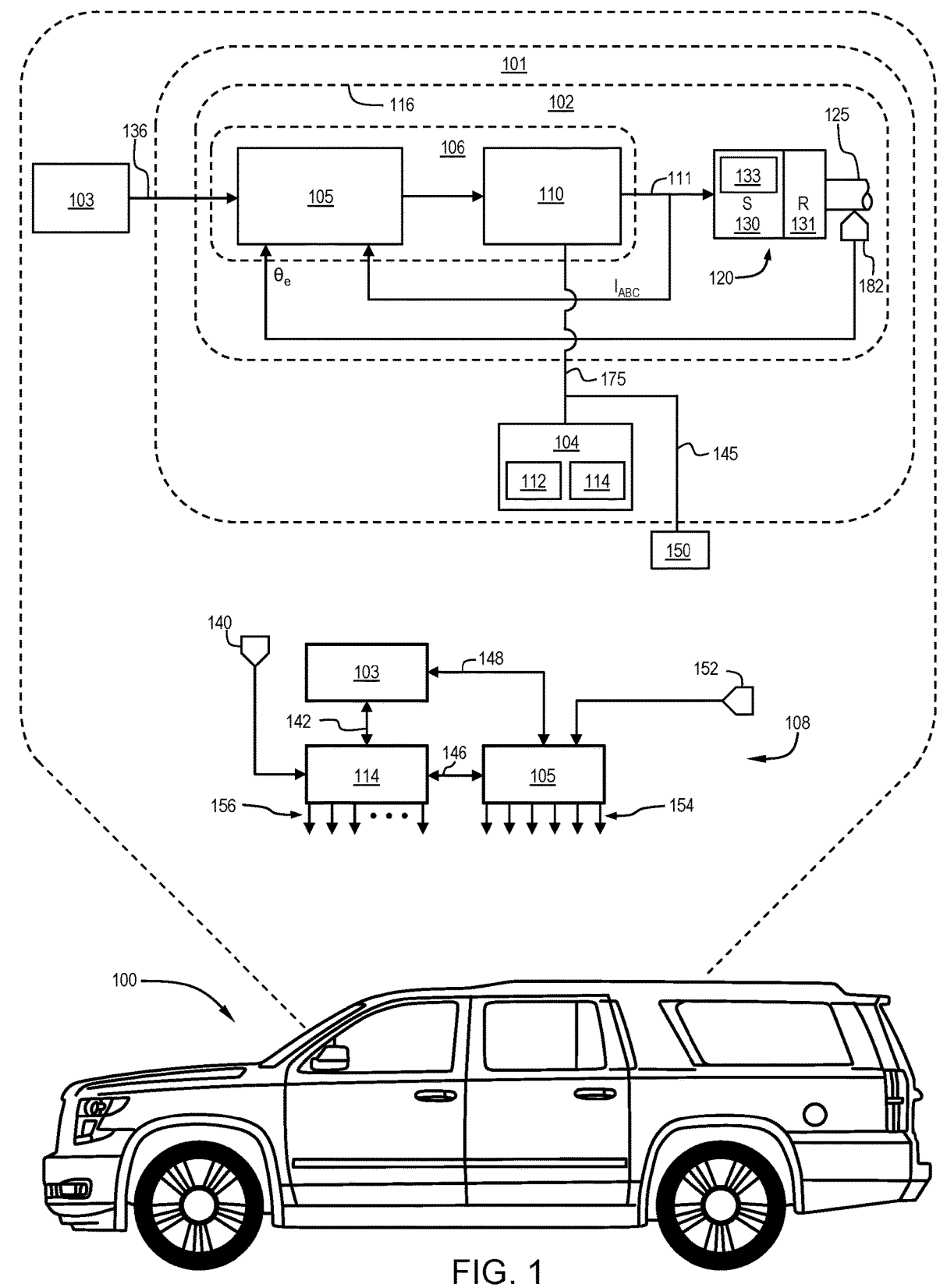
FIG. 1 illustrates an electric propulsion system in an electrified vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an exemplary electric propulsion system 101 on an electrified vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. The electric propulsion system 101 may include various control components and electrical and electro-mechanical systems including, for example, a rechargeable energy storage system (RESS) 104 and at least one electric drive unit (EDU) 102. The electric propulsion system 101 may be employed in a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry, integration and power capabilities. The EDU 102 may include, for example, an alternating current (AC) motor (motor) 120 and a traction power inverter module (TPIM) 106 including a motor controller 105 and a power inverter 110 which may be contained within or integrated with an EDU housing 116. The motor 120 may include a stator 130 (S) including stator winding 133 and a rotor 131 (R) coupled to a rotor shaft 125 and a position sensor 182, for example a resolver or an encoder. The position sensor 182 may signally connect directly to the motor controller 105 and is employed to monitor angular position of the rotor (θe) of the motor 120. The angular position of the rotor (fe) of the motor 120 is employed by the motor controller 105 to control operation of the power inverter 110 that controls the motor 120.

The rotor shaft 125 may transfer torque between the motor 120 and driveline components (not illustrated) at a drive end, for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 of the TPIM 106 of EDU 102.

In an embodiment, the RESS 104 may include one or more electro-chemical battery packs 112, for example high capacity, high voltage (HV) rechargeable lithium ion battery packs for providing power to the vehicle via a HV direct current (DC) bus 175. An accessory bus 145 may couple to the HV DC bus 175 for providing electrical energy to high voltage accessory loads 150 such as an auxiliary power module (e.g., a power converter to step down higher voltages to lower voltages), an air conditioning electronic compressor and a battery pack heater. The RESS 104 may also include a battery manager module 114. The RESS 104 battery packs 112 may be constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the battery packs 112 and battery pack modules may be modular to the extent that their numbers and configurations may be varied to accommodate a desired energy density or range objective of a particular vehicle platform, intended use, or cost target and in accordance with propulsion and charging functions and flexibility. Selective reconfiguration of the battery packs 112 and the battery pack modules may be by way of controllable switches for opening and closing various electrical paths effective to provide various parallel and series configurations of the battery packs 112 and the battery pack modules. The switches may be implemented as ultra-low voltage drop solid state devices such as MOS controlled thyristors (MCTs), GaN field effect transistors (FETs), SiC junction field effect transistors (JFETs), metal-oxide-semiconductor field-effect transistors (MOSFETs), insulated-gate bipolar transistors (IGBTs) or other low loss devices of suitable voltage and current ratings. The switches may also be implemented using electromechanical relays (EMRs) or a combination of EMRs in parallel with solid state devices to further reduce the on-state conduction losses wherein the solid state device carries the current during switching from on-to-off or off-to-on state of the electromechanical relay to eliminate arcing. The RESS 104 may include a plurality of battery packs 112 each having a nominal battery pack voltage of, for example, 400 volts or 800 volts and being configured in parallel in respective 400 volt or 800 volt propulsion architectures during propulsion and during direct current fast charging (DCFC). The battery packs 112 may also be selectively coupled to the HV DC bus 175 and to charge ports by way of switches. Some or all such switches may be integrated into one or more controllable battery disconnect units (BDU) (not illustrated) or distributed variously within components or subsystems such as the RESS 104. It is understood that the RESS 104 may be reconfigurable at any level of integration including battery pack, battery module and cell levels.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase power inverter. The power inverter 110 may include a plurality of solid-state switches based on IGBT and power MOSFET devices, for example. The power inverter 110 may couple to DC power provided by the HV DC bus 175 from the RESS 104. The HV DC bus may couple to the power inverter 110, the accessory bus 145 and to other high voltage loads including additional power converters (not illustrated). The motor controller 105 is coupled to the power inverter 110 for control thereof. The power inverter 110 electrically connects to stator phase windings of a poly-phase stator winding of the motor 120 via the AC bus 111, with electric current monitored on two or three of the phase leads thereof. The power inverter 110 is configured with suitable control circuits including paired power transistors for transforming high-voltage DC electric power to high-voltage AC electric power and transforming high-voltage AC electric power to high-voltage DC electric power. The power inverter 110 may employ pulse width modulation (PWM) control to convert stored DC electric power originating in the battery packs 112 of the RESS 104 to AC electric power to drive the motor 120 to generate torque. Similarly, the power inverter 110 may convert mechanical power transferred to the motor 120 to DC electric power to generate electric energy that is storable in the battery packs 112 of the RESS 104, including as part of a regenerative control strategy. The power inverter 110 may be configured to receive motor control commands from motor controller 105 and control power inverter states to provide the motor drive and regeneration functionality.

Control of the power inverter 110 may include high frequency switching of the solid-state switches in accordance with a PWM control. A number of design and application considerations and limitations determine inverter switching frequency and PWM control. Inverter controls for AC motor applications may include fixed switching frequencies, for example switching frequencies around 10-20 kHz and PWM controls that minimize switching losses of the solid-state switches of the power inverter 110.

The electric propulsion system 101 on the vehicle 100 may include a control system 108 including one or more electronic control units (ECU), for example the vehicle controller 103, the battery manager module 114, and the motor controller 105. The control system 108 may be responsible for carrying out functions related to the propulsion system 101 monitoring, control and diagnostics, including RESS charge control or supervision, based upon a plurality of inputs. The vehicle controller 103 may include one or more ECUs and may be responsible for supervising, interpreting various user and environmental inputs, information arbitration, and issuing and receiving control commands and requests to and from various other ECUs, including the battery manager module 114 and the motor controller 105 as illustrated by communication lines 142, 146 and 148. The battery manager module 114 may include one or more ECUs and may receive a plurality of inputs 140 related to the RESS 104 including, for example, voltage, current and temperature at cell, module, pack and RESS levels at various module and pack configurations, and may determine state of charge (SOC), depth of discharge (DOD) state of health (SOH) and other metrics at cell, module, pack and RESS levels at various module and pack configurations. The battery manager module 114 may also communicate with charging infrastructure through charging port control pilot and proximity pilot communications. The battery manager module 114 may be responsible for charge and discharge control, monitoring and diagnostics of the RESS 104, and selective reconfiguration of the RESS through control of a plurality of switches by issuing switch state commands 156 to the switches. The individual state commands may be issued in the form of binary state signals (e.g., 1=on/closed, 0=off/open) from the battery manager module 114. The motor controller 105 may include one or more ECUs and may receive various inputs 152 used in the monitoring, control and diagnosis of the motor 120 and power inverter 110, including phase currents IABC from respective current sensors and rotor position information from the position sensor 182. The motor controller 105 may control the motor 120 by issuing conduction commands 154 to the power inverter solid-state switches. The individual conduction commands may be issued in the form of PWM signals from the motor controller 105. Any suitable solid-state device may be employed as the inverter solid-state switches including, for example, solid-state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each power inverter solid-state switch may also have an associated anti-parallel diode either as a discrete component or integrated with each solid-state switch. In accordance with one embodiment, the battery manager module 114 may be responsible for monitoring and diagnosis of the RESS 104, for discharge and charge control including during propulsion operation and for electric power transfers from and to off-vehicle power sources, including infrastructure chargers and other vehicles.

The control system 108, including the vehicle controller 103, the battery manager module 114, and the motor controller 105, may include one or more ECUs. As used herein, ECU, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

FIG. 2A illustrates an embodiment of portions of a RESS 104 in electric propulsion system 101 on an electrified vehicle 100 including a plurality of three battery packs (BP1, BP2, BP3) and a plurality of switches (S1, S2, Sa1, Sb1, Sc1, Sa2, Sb2, Sc2, Sa3, Sb3) suitable for various propulsion mode configurations and charging mode configurations as further described herein. In the embodiment of FIG. 2A, the battery packs (BP1, BP2, BP3) may be disconnected from the charging port 165 by opening the switches S1 and S2 while configuring the battery packs (BP1, BP2, BP3) across the HV DC bus 175 by controlling the states of the plurality of upper switches (Sa1, Sb1, Sc1), lower switches (Sa2, Sb2, Sc2) and series switches (Sa3, Sb3) in a propulsion mode. The battery packs (BP1, BP2, BP3) may be configured across the HV DC bus 175 and across the charging port 165 by controlling the states of the plurality of upper switches (Sa1, Sb1, Sc1), lower switches (Sa2, Sb2, Sc2) and series switches (Sa3, Sb3) in a charge mode. Charge mode as used herein may include the vehicle 100 receiving or donating electrical energy. Switch states may be controlled by switch state commands 156 from battery manager module 114.

In the three battery pack embodiment of FIG. 2A, BP2 and BP3 may each have a voltage (N) of, for example, 400 volts. BP1 may have a voltage (2N) of, for example 800 volts. BP2 and BP3 may each have a charging current capability (M) of, for example, 250 amperes. BP1 may have a have a charging current capability (2M) of, for example, 500 amperes. The charging current capability (M) is identified on respective battery packs in FIGS. 2A, 2B and 2C by black corners. The charging current capability (2M) is identified on respective battery packs in FIGS. 2A, 2B and 2C by the absence of black corners. The charging current capability of a battery pack may correspond to a design rating for charging the battery pack and may correspond to a multiple—integer or non-integer—of the battery pack C-rate. The battery manager module 114 may control the states of the plurality of switches based on the respective battery pack voltages, the respective charging current capability and the voltage capabilities of a charge station, donor vehicle or recipient vehicle connected to the charge port 165 to selectively establish the battery packs and switches in one of several charging configurations.

In the embodiment of FIGS. 2A and 2B, one charging configuration may include respective states of the plurality of switches arranging the plurality of battery packs to provide 800 (2N) volts at the charging port 165. This charging configuration is illustrated in FIG. 2B with the corresponding switch states set forth in Table 1 herein. With reference to FIG. 2B, it is appreciated that BP2 and BP3 are configured in series as a first charging unit (CU1) which is configured in parallel with a second charging unit (CU2) which is BP1. Advantageously, such charging configuration may enable electrical energy transfer across the charge port 165 at 800 (2N) volts. Furthermore, the battery pack configuration may be configured across the HV DC bus 175, advantageously providing 800 (2N) volts for provision to HV DC bus loads during electrical energy transfer across the charge port 165.

In the embodiment of FIGS. 2A and 2C, another charging configuration may include respective states of the plurality of switches arranging the plurality of battery packs to provide 1200 (3N) volts at the charging port 165. This charging configuration is illustrated in FIG. 2C with the corresponding switch states set forth in Table 1 herein. With reference to FIG. 2C, it is appreciated that BP2 and BP3 are configured in parallel as a first charging unit (CU1) which is configured in series with the second charging unit (CU2) which is BP1. Advantageously, such charging configuration may enable electrical energy transfer across the charge port 165 at 1200 (2N) volts. Furthermore, BP1 may be configured across the HV DC bus 175, advantageously providing 800 (2N) volts for provision to HV DC bus loads during electrical energy transfer across the charge port 165.

TABLE 1

| | CHARGING CONFIGURATION | | |
|---|---|---|---|
| SWITCH | N-VOLTS SWITCH STATE | 2N-VOLTS (FIG. 2B) SWITCH STATE | 3N-VOLTS (FIG. 2C) SWITCH STATE |
| S1 | n/a | 1 | 1 |
| S2 | n/a | 1 | 1 |
| Sa1 | n/a | 1 | 1 |
| Sb1 | n/a | 1 | 0 |
| Sc1 | n/a | 0 | 1 |
| Sa2 | n/a | 1 | 1 |
| Sb2 | n/a | 0 | 1 |
| Sc2 | n/a | 1 | 0 |
| Sa3 | n/a | 0 | 1 |
| Sb3 | n/a | 1 | 0 |

FIG. 3A illustrates an embodiment of portions of a RESS 104 in electric propulsion system 101 on an electrified vehicle 100 including a plurality of four battery packs (BP1, BP2, BP3, BP4) and a plurality of switches (S1, S2, Sa1, Sb1, Sc1, Sd1, Sa2, Sb2, Sc2, Sd2, Sa3, Sb3, Sc3) suitable for various propulsion mode configurations and charging mode configurations as further described herein. In the embodiment of FIG. 3A, the battery packs (BP1, BP2, BP3, BP4) may be disconnected from the charging port 165 by opening the switches S1 and S2 while configuring the battery packs (BP1, BP2, BP3, BP4) across the HV DC bus 175 by controlling the states of the plurality of upper switches (Sa1, Sb1, Sc1, Sd1), lower switches (Sa2, Sb2, Sc2, Sd2) and series switches (Sa3, Sb3, Sc3) in a propulsion mode. The battery packs (BP1, BP2, BP3, BP4) may be configured across the HV DC bus 175 and across the charging port 165 by controlling the states of the plurality of upper switches (Sa1, Sb1, Sc1, Sd1), lower switches (Sa2, Sb2, Sc2, Sd2) and series switches (Sa3, Sb3, Sc3) in a charge mode. Charge mode as used herein may include the vehicle 100 receiving or donating electrical energy. Switch states may be controlled by switch state commands 156 from battery manager module 114.

In the four battery pack embodiment of FIG. 3A, all battery packs BP1, BP2, BP3, BP4 may have a voltage (N) of, for example, 400 volts. BP3 and BP4 may each have a charging current capability (M) of, for example, 250 amperes. BP1 and BP2 may have a have a charging current capability (2M) of, for example, 500 amperes. The charging current capability (M) is identified on respective battery packs in FIGS. 3A, 3B, 3C and 3D by black corners. The charging current capability (2M) is identified on respective battery packs in FIGS. 3A, 3B, 3C and 3D by the absence of black corners. The charging current capability of a battery pack may correspond to a design rating for charging the battery pack and may correspond to a multiple—integer or non-integer—of the battery pack C-rate. The battery manager module 114 may control the states of the plurality of switches based on the respective battery pack voltages, the respective charging current capability and the voltage capabilities of a charge station, donor vehicle or recipient vehicle connected to the charge port 165 to selectively establish the battery packs and switches in one of several charging configurations.

In the embodiment of FIGS. 3A and 3B, one charging configuration may include respective states of the plurality of switches arranging the plurality of battery packs to provide 400 (N) volts at the charging port 165. This charging configuration is illustrated in FIG. 3B with the corresponding switch states set forth in Table 2 herein. With reference to FIG. 3B, it is appreciated that all battery packs BP1, BP2, BP3 and BP4 are configured in parallel with a first charging unit (CU1) including BP3 and BP4 which is configured in parallel with a second charging unit (CU2) including BP1 and BP2. Advantageously, such charging configuration may enable electrical energy transfer across the charge port 165 at 400 (N) volts. Furthermore, the battery pack configuration may be configured across the HV DC bus 175, advantageously providing 400 (N) volts for provision to HV DC bus loads during electrical energy transfer across the charge port 165.

In the embodiment of FIGS. 3A and 3C, another charging configuration may include respective states of the plurality of switches arranging the plurality of battery packs to provide 800 (2N) volts at the charging port 165. This charging configuration is illustrated in FIG. 3C with the corresponding switch states set forth in Table 2 herein. With reference to FIG. 3C, it is appreciated that BP3 and BP4 are configured in series as a first charging unit (CU1) which is configured in parallel with a second charging unit (CU2) which is BP1 and BP2 configured in series. Advantageously, such charging configuration may enable electrical energy transfer across the charge port 165 at 800 (2N) volts. Furthermore, the battery pack configuration may be configured across the HV DC bus 175, advantageously providing 800 (2N) volts for provision to HV DC bus loads during electrical energy transfer across the charge port 165.

In the embodiment of FIGS. 3A and 3D, yet another charging configuration may include respective states of the plurality of switches arranging the plurality of battery packs to provide 1200 (3N) volts at the charging port 165. This charging configuration is illustrated in FIG. 3D with the corresponding switch states set forth in Table 2 herein. With reference to FIG. 3D, it is appreciated that BP3 and BP4 are configured in parallel as a first charging unit (CU1) which is configured in series with the second charging unit (CU2) which is which is BP1 and BP2 configured in series. Advantageously, such charging configuration may enable electrical energy transfer across the charge port 165 at 1200 (3N) volts. Furthermore, the second charging unit (CU2) which is which is BP1 and BP2 configured in series may be configured across the HV DC bus 175, advantageously providing 800 (2N) volts for provision to HV DC bus loads during electrical energy transfer across the charge port 165.

TABLE 2

| | CHARGING CONFIGURATION | | |
|---|---|---|---|
| | N-VOLTS (FIG. 3B) | 2N-VOLTS (FIG. 3C) | 3N-VOLTS (FIG. 3D) |
| SWITCH | SWITCH STATE | SWITCH STATE | SWITCH STATE |
| S1 | 1 | 1 | 1 |
| S2 | 1 | 1 | 1 |
| Sa1 | 1 | 1 | 1 |
| Sb1 | 1 | 0 | 0 |
| Sc1 | 1 | 1 | 0 |
| Sd1 | 1 | 0 | 1 |

TABLE 2-continued

| | CHARGING CONFIGURATION | | |
|---|---|---|---|
| | N-VOLTS (FIG. 3B) | 2N-VOLTS (FIG. 3C) | 3N-VOLTS (FIG. 3D) |
| SWITCH | SWITCH STATE | SWITCH STATE | SWITCH STATE |
| Sa2 | 1 | 0 | 0 |
| Sb2 | 1 | 1 | 1 |
| Sc2 | 1 | 0 | 1 |
| Sd2 | 1 | 1 | 0 |
| Sa3 | 0 | 1 | 1 |
| Sb3 | 0 | 0 | 1 |
| Sc3 | 0 | 1 | 0 |

Figure 4A:
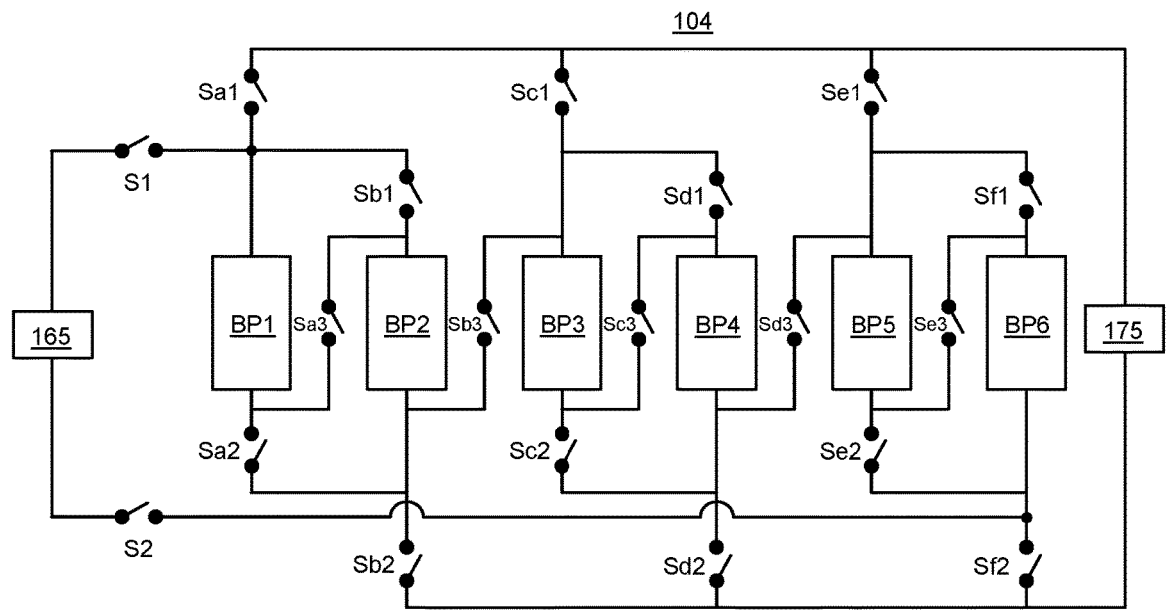
FIG. 4A-4D illustrate battery packs, switches and configurations of a rechargeable energy storage system, in accordance with one or more embodiments.

FIG. 4A illustrates an embodiment of portions of a RESS 104 in electric propulsion system 101 on an electrified vehicle 100 including a plurality of six battery packs (BP1, BP2, BP3, BP4, BP5, BP6) and a plurality of switches (S1, S2, Sa1, Sb1, Sc1, Sd1, Se1, Sf1, Sa2, Sb2, Sc2, Sd2, Se2, Sf2, Sa3, Sb3, Sc3, Sd3, Se3) suitable for various propulsion mode configurations and charging mode configurations as further described herein. In the embodiment of FIG. 4A, the battery packs (BP1, BP2, BP3, BP4, BP5, BP6) may be disconnected from the charging port 165 by opening the switches S1 and S2 while configuring the battery packs (BP1, BP2, BP3, BP4, BP5, BP6) across the HV DC bus 175 by controlling the states of the plurality of upper switches (Sa1, Sb1, Sc1, Sd1, Se1, Sf1), lower switches (Sa2, Sb2, Sc2, Sd2, Se2, Sf2) and series switches (Sa3, Sb3, Sc3, Sd3, Se3) in a propulsion mode. The battery packs (BP1, BP2, BP3, BP4, BP5, BP6) may be configured across the HV DC bus 175 and across the charging port 165 by controlling the states of the plurality of upper switches (Sa1, Sb1, Sc1, Sd1, Se1, Sf1), lower switches (Sa2, Sb2, Sc2, Sd2, Se2, Sf2) and series switches (Sa3, Sb3, Sc3, Sd3, Se3) in a charge mode. Charge mode as used herein may include the vehicle 100 receiving or donating electrical energy. Switch states may be controlled by switch state commands 156 from battery manager module 114.

In the six battery pack embodiment of FIG. 4A, all battery packs BP1, BP2, BP3, BP4, BP5, BP6 may have a voltage (N) of, for example, 400 volts. All battery packs BP1, BP2, BP3, BP4, BP5, BP6 may have a charging current capability (M) of, for example, 500 amperes. The charging current capability of a battery pack may correspond to a design rating for charging the battery pack and may correspond to a multiple—integer or non-integer—of the battery pack C-rate. The battery manager module 114 may control the states of the plurality of switches based on the respective battery pack voltages, the respective charging current capability and the voltage capabilities of a charge station, donor vehicle or recipient vehicle connected to the charge port 165 to selectively establish the battery packs and switches in one of several charging configurations.

Figure 4B:
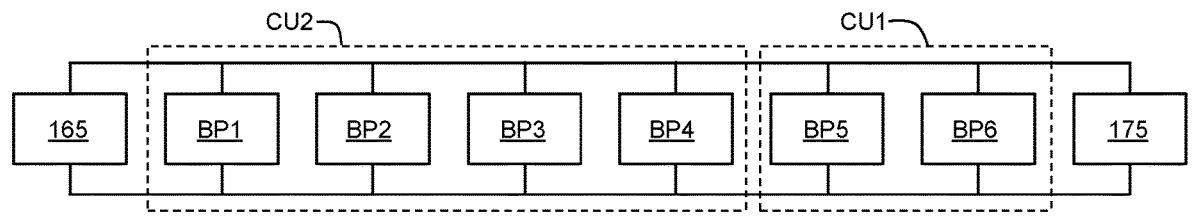

In the embodiment of FIGS. 4A and 4B, one charging configuration may include respective states of the plurality of switches arranging the plurality of battery packs to provide 400 (N) volts at the charging port 165. This charging configuration is illustrated in FIG. 4B with the corresponding switch states set forth in Table 3 herein. With reference to FIG. 4B, it is appreciated that all battery packs BP1, BP2, BP3, BP4, BP5 and BP6 are configured in parallel. Advantageously, such charging configuration may enable electrical energy transfer across the charge port 165 at 400 (N) volts. Furthermore, the battery pack configuration may be configured across the HV DC bus 175, advantageously providing 400 (N) volts for provision to HV DC bus loads during electrical energy transfer across the charge port 165.

Figure 4C:
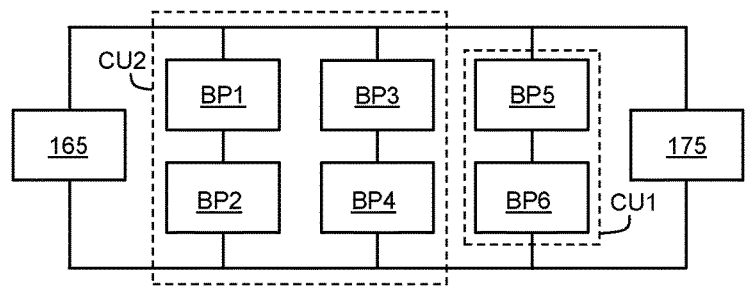

In the embodiment of FIGS. 4A and 4C, another charging configuration may include respective states of the plurality of switches arranging the plurality of battery packs to provide 800 (2N) volts at the charging port 165. This charging configuration is illustrated in FIG. 4C with the corresponding switch states set forth in Table 3 herein. With reference to FIG. 4C, it is appreciated that BP5 and BP6 are configured in series as a first charging unit (CU1) which is configured in parallel with a second charging unit (CU2) which is a first pair BP1 and BP2 configured in series, a second pair BP3 and BP4 configured in series, and the first and second pairs configured in parallel. Advantageously, such charging configuration may enable electrical energy transfer across the charge port 165 at 800 (2N) volts. Furthermore, the battery pack configuration may be configured across the HV DC bus 175, advantageously providing 800 (2N) volts for provision to HV DC bus loads during electrical energy transfer across the charge port 165.

Figure 4D:
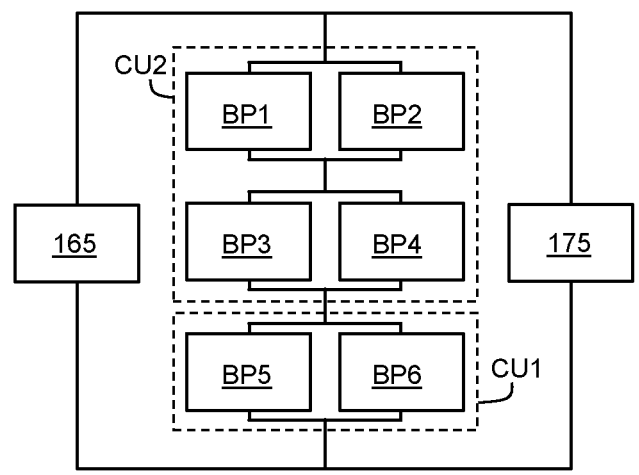

In the embodiment of FIGS. 4A and 4D, yet another charging configuration may include respective states of the plurality of switches arranging the plurality of battery packs to provide 1200 (3N) volts at the charging port 165. This charging configuration is illustrated in FIG. 4D with the corresponding switch states set forth in Table 3 herein. With reference to FIG. 4D, it is appreciated that BP5 and BP6 are configured in parallel as a first charging unit (CU1) which is configured in series with the second charging unit (CU2) which is a first pair BP1 and BP2 configured in parallel, a second pair BP3 and BP4 configured in parallel, and the first and second pairs configured in series. Advantageously, such charging configuration may enable electrical energy transfer across the charge port 165 at 1200 (3N) volts. Furthermore, the battery pack configuration may be configured across the HV DC bus 175, advantageously providing 1200 (N) volts for provision to HV DC bus loads during electrical energy transfer across the charge port 165.

TABLE 3

| | CHARGING CONFIGURATION | | |
|---|---|---|---|
| SWITCH | N-VOLTS (FIG. 4B) SWITCH STATE | 2N-VOLTS (FIG. 4C) SWITCH STATE | 3N-VOLTS (FIG. 4D) SWITCH STATE |
| S1 | 1 | 1 | 1 |
| S2 | 1 | 1 | 1 |
| Sa1 | 1 | 1 | 0 |
| Sb1 | 1 | 0 | 1 |
| Sc1 | 1 | 1 | 0 |
| Sd1 | 1 | 0 | 1 |
| Se1 | 1 | 1 | 0 |
| Sf1 | 1 | 0 | 1 |
| Sa2 | 1 | 0 | 1 |
| Sb2 | 1 | 1 | 0 |
| Sc2 | 1 | 0 | 1 |
| Sd2 | 1 | 1 | 0 |
| Se2 | 1 | 0 | 1 |
| Sf2 | 1 | 1 | 0 |
| Sa3 | 0 | 1 | 0 |
| Sb3 | 0 | 0 | 1 |
| Sc3 | 0 | 1 | 0 |
| Sd3 | 0 | 0 | 1 |
| Se3 | 0 | 1 | 0 |

Figure 5D:
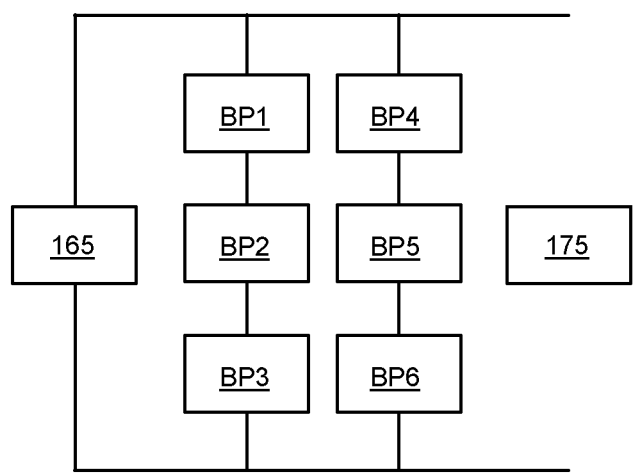
FIG. 5A-5D illustrate battery packs, switches and configurations of a rechargeable energy storage system, in accordance with one or more embodiments.
Figure 5A:
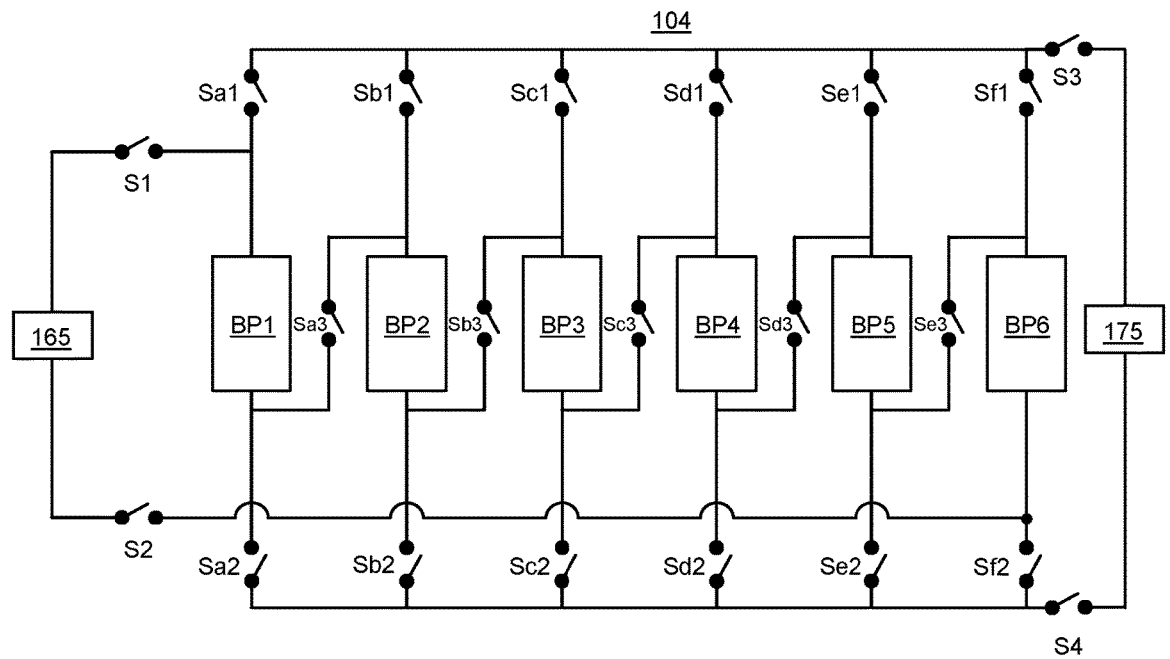

FIG. 5A illustrates an embodiment of portions of a RESS 104 in electric propulsion system 101 on an electrified vehicle 100 including a plurality of six battery packs (BP1, BP2, BP3, BP4, BP5, BP6) and a plurality of switches (S1, S2, S3, S4, Sa1, Sb1, Sc1, Sd1, Se1, Sf1, Sa2, Sb2, Sc2, Sd2, Se2, Sf2, Sa3, Sb3, Sc3, Sd3, Se3) suitable for various propulsion mode configurations and charging mode configurations as further described herein. In the embodiment of FIG. 5A, the battery packs (BP1, BP2, BP3, BP4, BP5, BP6) may be disconnected from the charging port 165 by opening the switches S1 and S2 while configuring the battery packs (BP1, BP2, BP3, BP4, BP5, BP6) across the HV DC bus 175 by controlling the states of the plurality of upper switches (Sa1, Sb1, Sc1, Sd1, Se1, Sf1, S3), lower switches (Sa2, Sb2, Sc2, Sd2, Se2, Sf2, S4) and series switches (Sa3, Sb3, Sc3, Sd3, Se3) in a propulsion mode. The battery packs (BP1, BP2, BP3, BP4, BP5, BP6) may be configured across the HV DC bus 175 and across the charging port 165 by controlling the states of the plurality of upper switches (Sa1, Sb1, Sc1, Sd1, Se1, Sf1, S3), lower switches (Sa2, Sb2, Sc2, Sd2, Se2, Sf2, S4) and series switches (Sa3, Sb3, Sc3, Sd3, Se3) in a charge mode. Charge mode as used herein may include the vehicle 100 receiving or donating electrical energy. Switch states may be controlled by switch state commands 156 from battery manager module 114.

In the six battery pack embodiment of FIG. 5A, all battery packs BP1, BP2, BP3, BP4, BP5, BP6 may have a voltage (N) of, for example, 400 volts. All battery packs BP1, BP2, BP3, BP4, BP5, BP6 may have a charging current capability (M) of, for example, 500 amperes. The charging current capability of a battery pack may correspond to a design rating for charging the battery pack and may correspond to a multiple—integer or non-integer—of the battery pack C-rate. The battery manager module 114 may control the states of the plurality of switches based on the respective battery pack voltages, the respective charging current capability and the voltage capabilities of a charge station, donor vehicle or recipient vehicle connected to the charge port 165 to selectively establish the battery packs and switches in one of several charging configurations.

Figure 5B:
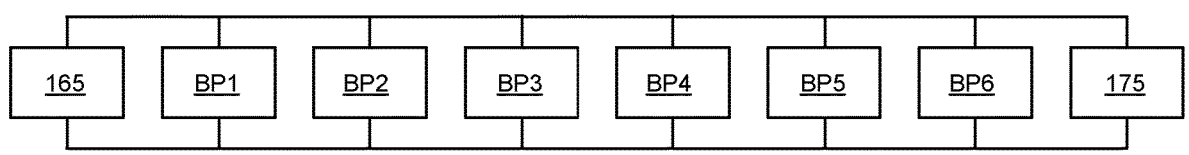

In the embodiment of FIGS. 5A and 5B, one charging configuration may include respective states of the plurality of switches arranging the plurality of battery packs to provide 400 (N) volts at the charging port 165. This charging configuration is illustrated in FIG. 5B with the corresponding switch states set forth in Table 4 herein. With reference to FIG. 5B, it is appreciated that all battery packs BP1, BP2, BP3, BP4, BP5 and BP6 are configured in parallel. Advantageously, such charging configuration may enable electrical energy transfer across the charge port 165 at 400 (N) volts. Furthermore, the battery pack configuration may be configured across the HV DC bus 175, advantageously providing 400 (N) volts for provision to HV DC bus loads during electrical energy transfer across the charge port 165.

Figure 5C:
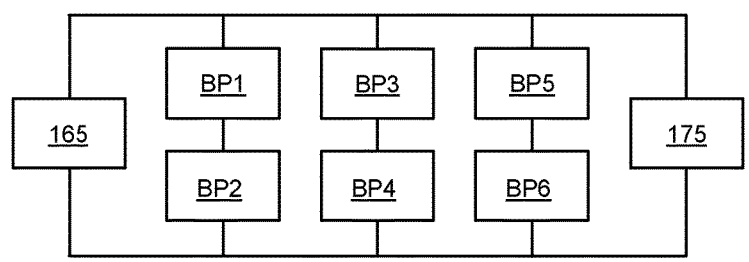

In the embodiment of FIGS. 5A and 5C, another charging configuration may include respective states of the plurality of switches arranging the plurality of battery packs to provide 800 (2N) volts at the charging port 165. This charging configuration is illustrated in FIG. 5C with the corresponding switch states set forth in Table 4 herein. With reference to FIG. 5C, it is appreciated that a first pair BP1 and BP2 are configured in series, a second pair BP3 and BP4 are configured in series and a third pair BP5 and BP6 are configured in series. The first, second and third pairs are configured in parallel. Advantageously, such charging configuration may enable electrical energy transfer across the charge port 165 at 800 (2N) volts. Furthermore, the battery pack configuration may be configured across the HV DC bus 175, advantageously providing 800 (2N) volts for provision to HV DC bus loads during electrical energy transfer across the charge port 165.

In the embodiment of FIGS. 5A and 5D, yet another charging configuration may include respective states of the plurality of switches arranging the plurality of battery packs to provide 1200 (3N) volts at the charging port 165. This charging configuration is illustrated in FIG. 5D with the corresponding switch states set forth in Table 4 herein. With reference to FIG. 5D, it is appreciated that a first triple BP1, BP2 and BP3 are configured in series, a second triple BP4, BP5 and BP6 are configured in series, and the first and second triples configured in parallel. Advantageously, such charging configuration may enable electrical energy transfer across the charge port 165 at 1200 (3N) volts. Furthermore, the battery pack configuration may be configured across the HV DC bus 175, advantageously providing 1200 (N) volts for provision to HV DC bus loads during electrical energy transfer across the charge port 165. However, the embodiment of FIG. 5D illustrates the battery pack configuration disconnected from the HV DC bus 175.

TABLE 4

| | CHARGING CONFIGURATION | | |
| --- | --- | --- | --- |
| SWITCH | N-VOLTS (FIG. 5B) SWITCH STATE | 2N-VOLTS (FIG. 5C) SWITCH STATE | 3N-VOLTS (FIG. 5D) SWITCH STATE |
| S1 | 1 | 1 | 1 |
| S2 | 1 | 1 | 1 |
| S3 | 1 | 1 | 0 |
| S4 | 1 | 1 | 0 |
| Sa1 | 1 | 1 | 1 |
| Sb1 | 1 | 0 | 0 |
| Sc1 | 1 | 1 | 0 |
| Sd1 | 1 | 0 | 1 |
| Se1 | 1 | 1 | 0 |
| Sf1 | 1 | 0 | 0 |
| Sa2 | 1 | 0 | 0 |
| Sb2 | 1 | 1 | 0 |
| Sc2 | 1 | 0 | 1 |
| Sd2 | 1 | 1 | 0 |
| Se2 | 1 | 0 | 0 |
| Sf2 | 1 | 1 | 1 |
| Sa3 | 0 | 1 | 1 |
| Sb3 | 0 | 0 | 1 |
| Sc3 | 0 | 1 | 0 |
| Sd3 | 0 | 0 | 1 |
| Se3 | 0 | 1 | 1 |

Figure 6:
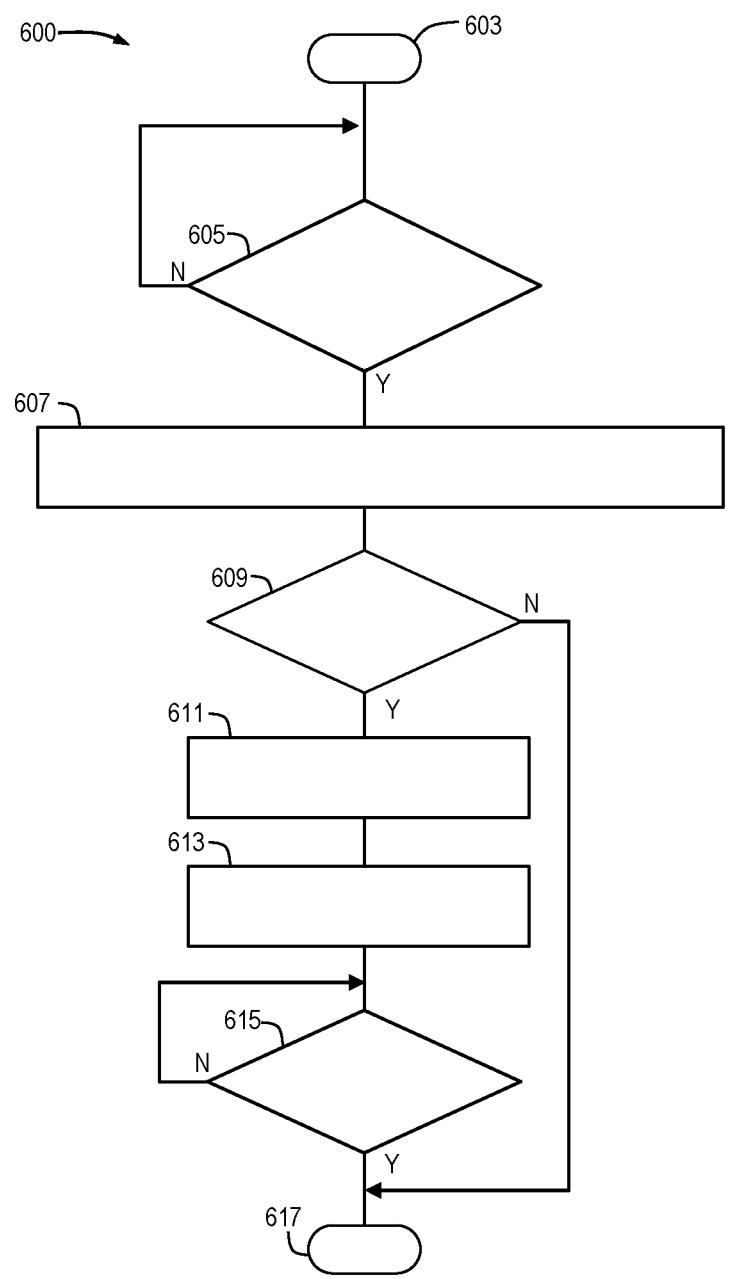
FIG. 6 illustrates a method of charging a rechargeable energy storage system, in accordance with one or more embodiments.

An exemplary method of charging a RESS 104 in an electrified vehicle 100 through control of a system as described herein is set forth in FIG. 6. FIG. 6 represents a plurality of tasks in a flowchart routine 600 that may be carried out, at least in part, through the control system 108 including one or more ECUs such as the vehicle controller 103, the motor controller 105, and the battery manager module 114 described in conjunction with FIG. 1. At least some of the tasks of FIG. 6 may be embodied in computer readable code or instruction sets stored within non-volatile memory of one or more ECUs. In the present example, the vehicle 100 may have a RESS 104 including a plurality of battery packs and switches as described herein. Beginning at 603, various entry conditions 605 for performing a vehicle charge may be validated. For example, conditions including whether the vehicle is immobile, proper charge port connection (e.g., proximity pilot information), and system faults may be checked. If entry conditions are not validated (N), then the charge may not proceed. When entry conditions are validated (Y), then the charge routine may continue at 607. At 607, vehicle charge capabilities (e.g., 400 volt, 800 volt, 1200 volt) may be determined based upon the RESS battery pack make up and configuration switches, available battery packs based on diagnostic information, vehicle user preferences and priorities, and other considerations. Also at 607, infrastructure charge capability (e.g., 400 volt, 800 volt, 1200 volt) may be determined, for example through control pilot communications with the charging infrastructure. At 609 the vehicle and infrastructure capabilities are arbitrated and an appropriate match determined. Where no appropriate match is determined, the routine 600 may exit at 617. An appropriate match (e.g., 400 volt, 800 volt, 1200 volt) may implement the corresponding charge routine beginning at 611 by the battery manager module 114 establishing appropriate switch states to configure the RESS battery packs for charge acceptance at the infrastructure charge capability (e.g., 400 volt, 800 volt, 1200 volt). At 613, the battery manager module 114 may provide the charging infrastructure with appropriate voltage and current commands thus managing the charge process. Charging will continue at 615 (N) until completion is determined (e.g., based on system capacity, time, user settings/requests, etc.). When charging is complete at 615 (Y), charging is stopped and the routine 600 may exit at 617.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electrified vehicle, comprising:
a charge port;
a rechargeable energy storage system comprising:
    a plurality of battery packs, each battery pack having a respective battery pack voltage of N volts or 2N volts and a respective charging current capability of M amperes or 2M amperes; and
    a plurality of switches; and
a control module controlling states of the plurality of switches based on the respective battery pack voltages and the respective charging current capability to selectively establish the rechargeable energy storage system in one of a first charging configuration, a second charging configuration and a third charging configuration;
the first charging configuration comprising first respective states of the plurality of switches arranging the plurality of battery packs to provide a voltage of N volts at the charging port;
the second charging configuration comprising second respective states of the plurality of switches arranging the plurality of battery packs to provide a voltage of 2N volts at the charging port; and
the third charging configuration comprising third respective states of the plurality of switches arranging the plurality of battery packs to provide a voltage of 3N volts at the charging port,
wherein the plurality of battery packs comprises:
    first and second battery packs having respective battery pack voltages of N volts and respective charging current capabilities of M amperes; and
    third and fourth second battery packs having respective battery pack voltages of N volts and respective charging current capabilities of 2M amperes;
    wherein the first charging configuration arranges the first, second, third and fourth battery packs in parallel across the charging port;
    wherein the second charging configuration arranges the first and second battery packs in series as a first series charging unit, arranges the third and fourth battery packs in series as a second series charging unit, and arranges the first and second series charging units in parallel across the charging port; and
    wherein the third charging configuration arranges the first and second battery packs in parallel as a first parallel charging unit, arranges the third and fourth battery packs in series as a second parallel charging unit, and arranges the first and second parallel charging units in series across the charging port.

2. The electrified vehicle of claim 1 wherein the plurality of battery packs comprises:
six battery packs having respective battery pack voltages of N volts and respective charging current capabilities of M amperes;
wherein the first charging configuration arranges the six battery packs in parallel across the charging port;
wherein the second charging configuration arranges the six battery packs into three series strings of two battery packs, and arranges the three series strings in parallel across the charging port; and
wherein the third charging configuration arranges the six battery packs into two series strings of three battery packs, the two series strings connected in parallel across the charging port.

3. An electrified vehicle, comprising:
a charge port;
a rechargeable energy storage system comprising:
    a plurality of switches;
    a control module controlling states of the plurality of switches to selectively establish the rechargeable energy storage system in one of a plurality of charging configurations;
    a pair of first battery packs, each first battery pack having a first voltage and a first charging current capability;
    a first charging configuration comprising a first charging unit comprising the pair of first battery packs, wherein the first battery packs in the pair of first battery packs are selectively configured in parallel, whereby the first charging unit has a respective voltage equivalent to the first voltage and a respective charging current capability two times the first charging current capability, the first charging unit selectively configured in series with a second charging unit having a respective charging current capability two times the first charging current capability; and
    a second charging configuration wherein the first charging unit is selectively configured in parallel with the second charging unit and wherein the first battery packs in the pair of first battery packs are selectively configured in series, whereby the first charging unit has a respective voltage equivalent to two times the first voltage and a respective charging current capability equivalent to the first charging current capability.

4. The electrified vehicle of claim 3 wherein the second charging unit has a respective voltage equivalent to the first voltage.

5. The electrified vehicle of claim 3 wherein the second charging unit has a respective voltage equivalent to two times the first voltage.

6. The electrified vehicle of claim 5 wherein the second charging unit comprises a second battery pack, the second battery pack having a respective voltage equivalent to two times the first voltage and a respective charging current capability two times the first charging current.

7. The electrified vehicle of claim 5 wherein the second charging unit comprises a pair of second battery packs, each second battery pack having a respective voltage equivalent to the first voltage and a respective charging current capability equivalent to two times the first charging current capability, wherein the second battery packs in the pair of second battery packs are selectively configured in series, whereby the second charging unit has a respective voltage equivalent to two times the first voltage and a respective charging current capability two times the first charging current capability.

8. The electrified vehicle of claim 5 wherein the second charging unit comprises two pairs of second battery packs, each second battery pack having a respective voltage equivalent to the first voltage and a respective charging current capability equivalent to the first charging current capability, wherein the respective second battery packs in each pair of second battery packs are selectively configured in parallel and the pairs of second battery packs are selectively configured in series, whereby the second charging unit has a respective voltage equivalent to two times the first voltage and a respective charging current capability two times the first charging current capability.

9. The electrified vehicle of claim 3 wherein the second charging unit comprises a second battery pack, the second battery pack having a respective voltage equivalent to the first voltage and a respective charging current capability two times the first charging current.

10. The electrified vehicle of claim 3 wherein the second charging unit comprises a pair of second battery packs, each second battery pack having a respective voltage equivalent to the first voltage and a respective charging current capability equivalent to the first charging current capability, wherein the second battery packs in the pair of second battery packs are selectively configured in parallel, whereby the second charging unit has a respective voltage equivalent to the first voltage and a respective charging current capability two times the first charging current capability.

11. The electrified vehicle of claim 3 wherein the second charging unit comprises a second battery pack, the second battery pack having a respective voltage equivalent to two times the first voltage and a respective charging current capability two times the first charging current capability.

12. The electrified vehicle of claim 3 wherein the second charging unit comprises a pair of second battery packs, each second battery pack having a respective voltage equivalent to the first voltage and a respective charging current capability equivalent to two times the first charging current capability, wherein the second battery packs in the pair of second battery packs are selectively configured in series, whereby the second charging unit has a respective voltage equivalent to two times the first voltage and a respective charging current capability two times the first charging current capability.

13. The electrified vehicle of claim 3 wherein the second charging unit comprises two pairs of second battery packs, each second battery pack having a respective voltage equivalent to the first voltage and a respective charging current capability equivalent to the first charging current capability, wherein the respective second battery packs in each pair of second battery packs are selectively configured in series and the pairs of second battery packs are selectively configured in parallel, whereby the second charging unit has a respective voltage equivalent to two times the first voltage and a respective charging current capability two times the first charging current capability.

14. A method for charging an electrified vehicle through a charging port, comprising:
validating entry condition for a vehicle charge;
establishing donor voltage capabilities of a charge station;
establishing recipient voltage capabilities of the electrified vehicle;
matching donor voltage capabilities with recipient voltage capabilities;
configuring a plurality of battery packs in the electrified vehicle based upon matched donor and recipient voltage capabilities including one of a first charging configuration, a second charging configuration or a third charging configuration;
wherein the first charging configuration comprises first respective states of a plurality of switches arranging the plurality of battery packs to present a first recipient voltage at the charging port;
wherein the second charging configuration comprises second respective states of the plurality of switches arranging the plurality of battery packs to present a second recipient voltage at the charging port, the second recipient voltage being double the first recipient voltage; and
wherein the third charging configuration comprises third respective states of the plurality of switches arranging the plurality of battery packs to present a third recipient voltage at the charging port, the third recipient voltage being triple the first recipient voltage
wherein the plurality of battery packs comprises:
six battery packs having respective battery pack voltages of N volts and respective charging current capabilities of M amperes;
wherein the first charging configuration arranges the six battery packs in parallel across the charging port;
wherein the second charging configuration arranges the six battery packs into three series strings of two battery packs, and arranges the three series strings in parallel across the charging port; and
wherein the third charging configuration arranges the six battery packs into two series strings of three battery packs, the two series strings connected in parallel across the charging port.

15. The method of claim 14, wherein validating the entry condition comprises determining whether the vehicle is immobile.

16. The method of claim 14, wherein validating the entry condition comprises determining whether a proper charge port connection has been established.

17. The method of claim 14, wherein validating the entry condition comprises determining whether any system faults exist.

18. The method of claim 14, further comprising performing charging until completion is determined, and stopping the charging once completion is determined.

19. The method of claim 14, wherein the voltage capabilities of the electrified vehicle is selected from a group consisting of substantially 400 volts, substantially 800 volts, and substantially 1200 volts.

20. The method of claim 14, wherein the recipient voltage capabilities of the electrified vehicle is selected from a group consisting of substantially 400 volts, substantially 800 volts, and substantially 1200 volts.

* * * * *